(12) United States Patent
Borowski

(10) Patent No.: US 7,567,522 B2
(45) Date of Patent: Jul. 28, 2009

(54) SUPPRESSION OF ROUTER ADVERTISEMENT

(75) Inventor: Olaf Borowski, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 818 days.

(21) Appl. No.: 10/831,258

(22) Filed: Apr. 23, 2004

(65) Prior Publication Data

US 2005/0237946 A1   Oct. 27, 2005

(51) Int. Cl.
*H04L 12/28* (2006.01)
(52) U.S. Cl. .................. 370/254; 370/401; 370/471; 709/242; 726/22
(58) Field of Classification Search ................ 370/254, 370/255, 351, 400, 401, 229–230, 389, 393; 709/223, 224, 225, 227–229
See application file for complete search history.

(56) References Cited

U.S. PATENT DOCUMENTS

| 5,790,554 | A | * | 8/1998 | Pitcher et al. ............. 370/471 |
| 5,805,801 | A | * | 9/1998 | Holloway et al. .......... 726/22 |
| 6,701,361 | B1 | * | 3/2004 | Meier ....................... 709/224 |
| 2002/0021675 | A1 | * | 2/2002 | Feldmann ................... 370/254 |
| 2002/0031135 | A1 | * | 3/2002 | Inoue ......................... 370/401 |
| 2003/0069990 | A1 | * | 4/2003 | D'Annunzio et al. ....... 709/242 |
| 2003/0091030 | A1 | * | 5/2003 | Yegin et al. ................. 370/352 |
| 2004/0213237 | A1 | * | 10/2004 | Yasue et al. ................. 370/392 |
| 2006/0182083 | A1 | * | 8/2006 | Nakata et al. ............... 370/352 |

OTHER PUBLICATIONS

Arkko, J., Aura, T., Kempf, J., Mäntylä, V., Nikander, P., and Roe, M. 2002. Securing IPv6 neighbor and router discovery. In Proceedings of the 1st ACM Workshop on Wireless Security (Atlanta, GA, USA, Sep. 28-28, 2002). WiSE '02. ACM, New York, NY, 77-86.*
"Header Format", by John Wells, Jul. 5, 2001, [webpages] [online], retrieved on Nov. 4, 2003. Retrieved from the internet: http://io.irean.vt.edu/~wells/rapport/node25.html. Total pp. 2.
"IPv6 Stateless Address Autoconfiguration" by S. Thomson, et al., Networking Group, Request for Comments: 2462, Dec. 1998, [webpages] [online], retrieved on Nov. 15, 2003. Retrieved from the internet: http://asg.web.cmu.edu/rfc/rfc2462.html. Total pp. 19.

* cited by examiner

*Primary Examiner*—Hassan Kizou
*Assistant Examiner*—Jeffrey M Rutkowski

(57) ABSTRACT

In an embodiment, an apparatus for detecting a router advertisement, includes: a network device configured to generate a response when a router advertisement is received in a port in the network device. In another embodiment, a method for detecting a router advertisement, includes: generating a response when a router advertisement is received in a port in the network device.

25 Claims, 13 Drawing Sheets

Link Local address — 55

Host A1 with no IPv6 network connection:

```
C:\ CommandPrompt

Microsoft Windows XP [Version 5.1.2600]
<C> Copyright 1985-2001 Microsoft Corp.

C:\Documents and Settings\Terri>ipconfig

Windows IP Configuration

Ethernet adapter Local Area Connection 3:

Connection-specific DNS Suffix . :
    IP Address. . . . . . . . . . . . : 192.168.1.99
    Subnet Mask . . . . . . . . . . . : 255.255.255.0
    IP Address. . . . . . . . . . . . : fe80::280:c7ff:fe40:ab96%4
    Default Gateway . . . . . . . . . :

Tunnel adapter Automatic Tunneling Pseudo-Interface:

Connection-specific DNS Suffix . :
    IP Address. . . . . . . . . . . . : fe80::5efe:192.168.1.99%2
    Default Gateway . . . . . . . . . :

C:\Documents and Settings\Terri>
```

Cisco1 A3 send out router advertisement message: ⎯ 58

```
Frame decode:
 Frame 2 (118 bytes on wire, 118 bytes captured)
    Arrival Time: Mar 23, 2004 13:41:13.069510000
    Time delta from previous packet: 5.928177000 seconds
    Time since reference or first frame: 5.928177000 seconds
    Frame number: 2
    Packet Length: 118 bytes
    Capture Length: 118 bytes
 Ethernet II, Src: 00:0e:d7:fb:1c:00, Dst: 33:33:00:00:00:01
    Destination: 33:33:00:00:00:01 (IPv6-Neighbor-
Discovery_00:00:00:01)
    Source: 00:0e:d7:fb:1c:00 (Cisco_fb:1c:00)
    Type: IPv6 (0x86dd)
 Internet Protocol Version 6
    Version: 6
    Traffic class: 0xe0
    Flowlabel: 0x00000
    Payload length: 64
    Next header: ICMPv6 (0x3a)
    Hop limit: 255
    Source address: fe80::20e:d7ff:fefb:1c00
    Destination address: ff02::1
 Internet Control Message Protocol v6
    Type: 134 (Router advertisement)
    Code: 0
    Checksum: 0x784d (correct)
    Cur hop limit: 64
    Flags: 0x00
        0... .... = Not managed
        .0.. .... = Not other
        ..0. .... = Not Home Agent
        ...0 0... = Router preference: Medium
    Router lifetime: 1800
    Reachable time: 0
    Retrans time: 0
    ICMPv6 options
        Type: 1 (Source link-layer address)
        Length: 8 bytes (1)
        Link-layer address: 00:0e:d7:fb:1c:00
    ICMPv6 options
        Type: 5 (MTU)
        Length: 8 bytes (1)
        MTU: 1500
    ICMPv6 options
        Type: 3 (Prefix information)
        Length: 32 bytes (4)
        Prefix length: 64
        Flags: 0xc0
            1... .... = Onlink
            .1.. .... = Auto
            ..0. .... = Not router address
            ...0 .... = Not site prefix
        Valid lifetime: 0x00015180
        Preferred lifetime: 0x00015180
        Prefix: 3ffe:80f0:1:2002::
```

60 ⎯ Advertised network prefix

FIG 1D

Host A1 after receiving router advertisement

```
Default Gateway ................:

C:\Documents and Settings\Terri>ipconfig

Windows IP Configuration

Ethernet adapter Local Area Connection 3:

Connection-specific DNS Suffix. :
  IP Address.................. : 192.168.1.99
  Subnet Mask................. : 255.255.255.0
  IP Address.................. : 3ffe:80f0:1:2002:1059:4082:4c71:2715

IP Address.................. : 3ffe:80f0:1:2002:280:c7ff:fe40:ab9b
  IP Address.................. : fe80::280e:c7ff:fe40:ab96%4
  Default Gateway............. : fe80::20e:d7ff:fefb:1c00%4

Tunnel adapter Automatic Tunneling Pseudo-Interface:

Connection-specific DNS Suffix. :
  IP Address.................. : fe80::5efe:192.168.1.99%2
  Default Gateway.............. :

C:\Documents and Settings\Terri>
```

62
Host A1 becomes member of advertised network and default gateway is set to link local address of Cisco1

FIG 1E

```
CommandPrompt

C:\ Documents and Settings\Terri>ipconfig

Windows IP Configuration:

Ethernet adapter Local Area Connection 3:

Connection-specific DNS Suffix. :
  IP Address...................... : 192.168.1.99
  Subnet Mask..................... : 255.255.255.0
  IP Address...................... : 3ffe:80f0:1:2002:1059:4082:4c71:2715

IP Address...................... : 3ffe:80f0:1:2002:280:c7ff:fe40:ab90
  IP Address...................... : fe80::280:c7ff:fe40:ab96%4
  Default Gateway................. : fe80::20e:d7ff:fedc:e4a0%4
                                     fe80::20e:d7ff:fefb:1c00%4

Tunnel adapter Automatic Tunneling Pseudo-Interface:

Connection-specific DNS Suffix. :
  IP Address...................... : fe80::5efe:192.168.1.99%2
  Default Gateway................. :

C:\Documents and Settings\Terri>
```

Host A1 has two default gateways now. Cisco2 is preferred.

FIG 2B

```
    MTU: 1500
ICMPv6 options
    Type: 3 (Prefix information)
    Length: 32 bytes (4)
    Prefix length: 64
    Flags: 0xc0
        1... .... = Onlink
        .1.. .... = Auto
        ..0. .... = Not router address
        ...0 .... = Not site prefix
    Valid lifetime: 0x00278d00
    Preferred lifetime: 0x00093a80
    Prefix: 3ffe:2002:1:aaaa::
ICMPv6 options
    Type: 3 (Prefix information)
    Length: 32 bytes (4)
    Prefix length: 64
    Flags: 0xc0
        1... .... = Onlink
        .1.. .... = Auto
        ..0. .... = Not router address
        ...0 .... = Not site prefix
    Valid lifetime: 0x00015180
    Preferred lifetime: 0x00015180
    Prefix: 3ffe:80f0:1:2002::
```

Prefix
3ffe:2002:1:aaaa::
Prefix
3ffe:80f0:1:2002::
Are advertised by
Cisco2

FIG 2C

```
Command Prompt

Ethernet adapter Local Area Connection 3:

Connection-specific DNS Suffix. :
    IP Address.................. : 192.168.1.99
    Subnet Mask................. : 255.255.255.0
    IP Address.................. : 3ffe:2002:1:aaaa:1059:4082:4c71:2715

IP Address.................. : 3ffe:2002:1:aaaa:260:c7ff:fe40:ab96
    IP Address.................. : 3ffe:1::1059:4082:4c71:2715
    IP Address.................. : 3ffe:1::260:c7ff:fe40:ab96
    IP Address.................. : 3ffe:80f0:1:2002:1059:4082:4c71:2715

IP Address.................. : 3ffe:80f0:1:2002:260:c7ff:fe40:ab96
    IP Address.................. : fe80::260:c7ff:fe40:ab96%4
    Default Gateway............. : fe80::20e:d7ff:fedc:e4a0%4
                                   fe80::20e:d7ff:fefb:1c00%4

Tunnel adapter Automatic Tunneling Pseudo-Interface:

Connection-specific DNS Suffix. :
    IP Address.................. : fe80::5efe::192.168.1.99%2
    Default Gateway............. :

C:\Documents and Settings\Terri>
```

Host A automatically became a member of
network 3FF3:2002:1:AAAA

FIG 2D

SUPPRESSION OF ROUTER ADVERTISEMENT

TECHNICAL FIELD

Embodiments of the invention relate generally to communication networks, and more particularly to the suppression of IPV6 router advertisement in a communication network.

BACKGROUND

Routing is a function associated with the Network Layer (layer 3) in the Open Systems Interconnection (OSI) model which is the standard model of network programming. On a communication network (e.g., the Internet), a router is typically a device that determines the next network point to which a packet should be forwarded so that the packet can reach its destination. The router is located at any gateway of at least two different networks and permits the connected different networks to communicate with each other. A router creates and maintains a table of the available routes and their conditions, and use this information (along with distance and cost algorithms) to determine the best route for a given packet. Typically, a packet may travel through a number of network points with routers before arriving at its destination.

In an environment where IPV6 stateless address autoconfiguration is used, an IPV6 router is required to advertise its presences in a network, by transmitting an advertisement that has information about the network. The router advertises at periodic time intervals in order to indicate that it is the dedicated router for that particular network or which network addresses are associated with the link. Additionally, the dedicated router can answer to a query from a client by responding with an advertisement to the client. The advertisement function is typically performed by the central processing unit (CPU) of the router.

In an IPV6 (Internet Protocol Version 6) network, any device that can access a physical port (on a network device in the network) can intentionally or unintentionally become the designated router for a particular network. The IPV6 standard is described in, for example, <http://asg.web.cmu.edu/rfc/rfc2462.html> which is hereby fully incorporated herein by reference.

If the client on an IPV6 network uses stateless address autoconfiguration (RFC 2462) to obtain network related information, a security issue arises. Stateless address autoconfiguration (RFC 2462) requires no manual configuration of hosts, minimal configuration of routers, and no additional servers. The stateless mechanism allows a host to generate its own addresses using a combination of locally available information and information advertised by routers. Routers advertise prefixes that identify the subnet associated with a link, while hosts generate an interface identifier that uniquely identifies an interface on a subnet. An address is formed by combining the two (prefix and interface identifier).

Assuming the unauthorized device is an IPV6 routing capable device, then that unauthorized device can become the designated router by plugging that unauthorized device to a physical port on the network device. This scenario can be a potential network security problem and may cause networking problems in general. The unauthorized device can also advertise additional network prefixes and any client configured for autoconfiguration will automatically become a member of this network.

The unauthorized device intentionally becomes the designated router if a hacker connects that unauthorized device to a network port on the network device, and the unauthorized device advertises itself as the best route for the network. The clients will erroneously learn that the unauthorized device is the designated router for the network, based upon the advertisements from the unauthorized device, and the clients will then change their routes to go through the unauthorized device. Therefore, all packet traffic for a network segment is diverted to this unauthorized device that is acting as the designated router. This unauthorized device can then examine all packets through a monitor port and forward the packets to a particular destination that permits sniffing of the packet content. The sniffing of the packet contents can permit a hacker to obtain passwords, credit card information, and/or other confidential information of a network user or can permit the hacker to otherwise disrupt the operation of the network.

The unauthorized device unintentionally becomes the designated router if the unauthorized device is connected to the network device for purposes of testing, or is unintentionally connected to a port (of the network device) where the port is not configured. The unauthorized device can potentially become the default gateway for the network, but will not have any routes to the rest of the network because the unauthorized device is not the proper designated router. The host node (client) will use this unauthorized device as the designated router, but the host user will receive back a message from the unauthorized device, where the message indicates that the network is unreachable. Therefore, in this manner, the unauthorized device will disrupt the normal operation of the network, and this disruption will persist until the unauthorized device is removed from the network or the entries regarding this unauthorized device are aged out (i.e., the entries are automatically deleted after a particular amount of time).

In one possible approach for network security, RFC (Request For Comment) 2462 mentions that IPSEC (Internet Protocol Security) could be used for authentication in network communication. Only devices in the network that could pass this authentication can become part of the network. IPSEC is a framework for a set of protocols for security at the network or packet processing layer of network communication. IPSEC provides two choices of security service: Authentication Header (AH), which essentially allows authentication of the sender of data, and Encapsulating Security Payload (ESP), which supports both authentication of the sender and encryption of data as well. The specific information associated with each of these services is inserted into the packet in a header that follows the IP packet header. Separate key protocols can be selected, such as the ISAKMP/Oakley protocol. However, IPSEC is not yet widely used and is not available for all devices.

In one possible approach for network security, 802.1x (port based network access control) authentication may be used in network communication. However, this standard may not function in an IPV6 (Internet Protocol Version 6) network.

Therefore, the current technology is limited in its capabilities and suffers from at least the above constraints and deficiencies.

SUMMARY OF EMBODIMENTS OF THE INVENTION

In one embodiment of the invention, an apparatus for suppressing a router advertisement includes a network device configured to filter a router advertisement from an unauthorized device.

In another embodiment of the invention, an apparatus for detecting a router advertisement includes a network device configured to generate a response when a router advertisement is received in a particular port in the network device. The response may be, for example, the filtering of the router advertisement, creation of a flag to indicate receipt of the router advertisement in the particular port, or transmission of an SNMP report to indicate receipt of the router advertisement in the particular port.

In another embodiment of the invention, an apparatus for detecting a router advertisement, includes: a network device configured to generate a response when a router advertisement is received in a port in the network device.

In another embodiment of the invention, a method for detecting a router advertisement, includes: generating a response when a router advertisement is received in a port in the network device.

In another embodiment of the invention, a method for suppressing a router advertisement includes filtering a router advertisement from an unauthorized device.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 1A-1E are diagrams of a network system and system operation, in accordance with an embodiment of the invention.

FIGS. 2A-2D are diagrams of a network system and system operation, in accordance with an embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

An embodiment of the invention advantageously provides security and maintainability of IPV6 networks. As a result, a network administrator can better control the resources on the network. An embodiment of the invention provides a network device that can filter advertisements from an unauthorized device. The network device uses a pre-defined filter to filter the advertisements from the unauthorized device. As a result, the network device can prevent an authorized device on the network to become the default gateway and also can prevent a host(s) (clients) from creating unwanted virtual interfaces to the default gateway. Therefore, a host is prevented from creating an excessive number of virtual interfaces that can cause the host to crash.

Figure 3:
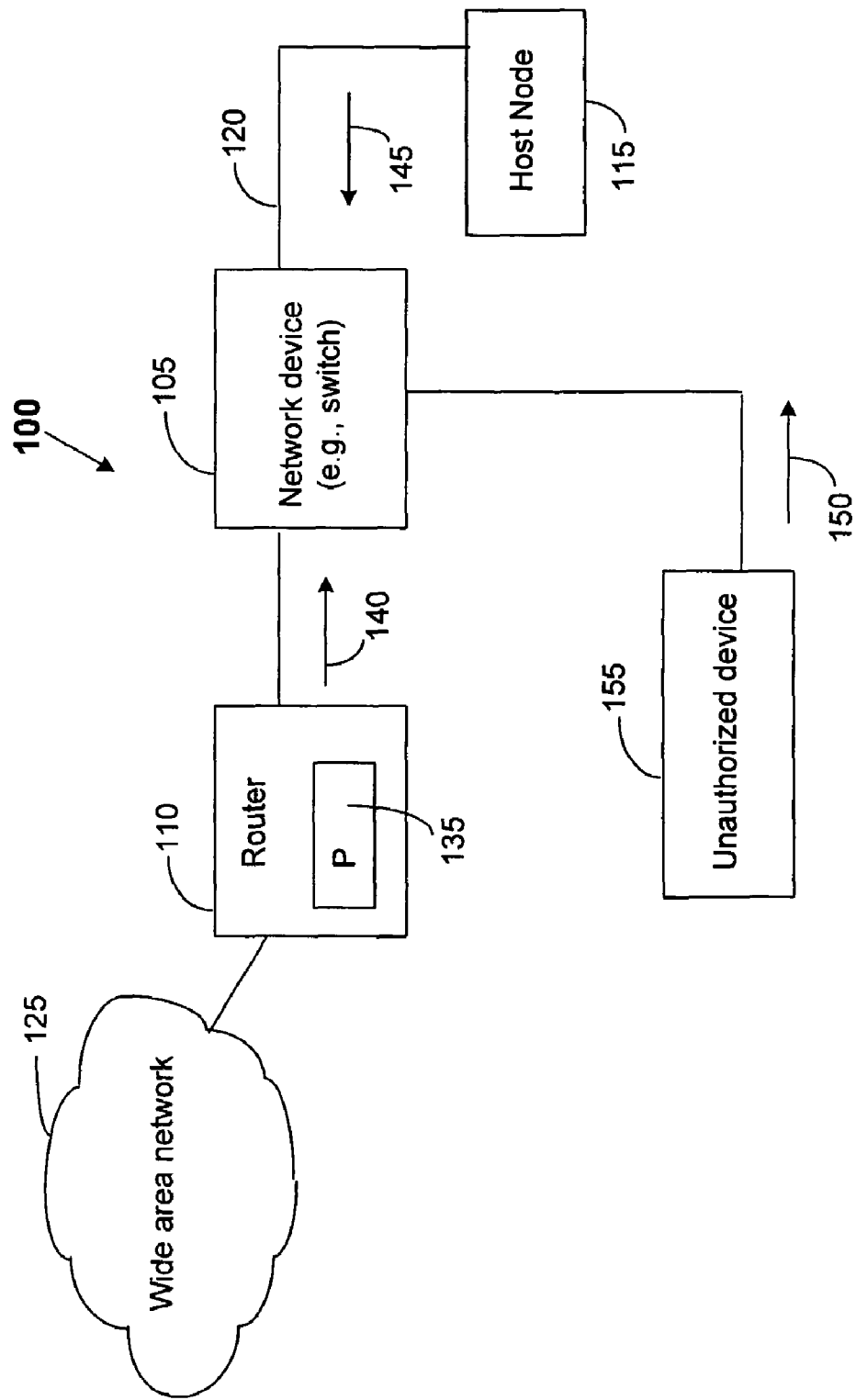
FIG. 3 is a block diagram of a network system, in accordance with an embodiment of the invention.

Referring initially to FIG. 3, there is shown a block diagram of a network system 100 with a network device 105, in accordance with an embodiment of the invention. As discussed below, one example of the network device 105 is an embodiment of a switch 105A in FIG. 4. At least one host node 115 is connected to a segment 120 that is connected to the router 110 via network device 105. The node 115 can send queries 120 to determine the designated router for the network. In a flat layer 2 network, hundreds of host nodes 115 may be connected to the segment 120. A host node 115 may typically be an end point node such as a client device.

As known to those skilled in the art, a segment is a portion of a network and is separated by a bridge or router from other parts of the network. Within a network segment, data can flow between any two points without having to pass through switches, routers, bridges, or hubs. The size of a segment may be defined by the number of nodes within it, or by the amount of network traffic carried by the segment. Typically, a segment is a single continuous link or may be multiple links connected by repeaters. A link may be, for example, a suitable communication media such as copper, fibre, and/or air (wireless media).

Figure 1A:
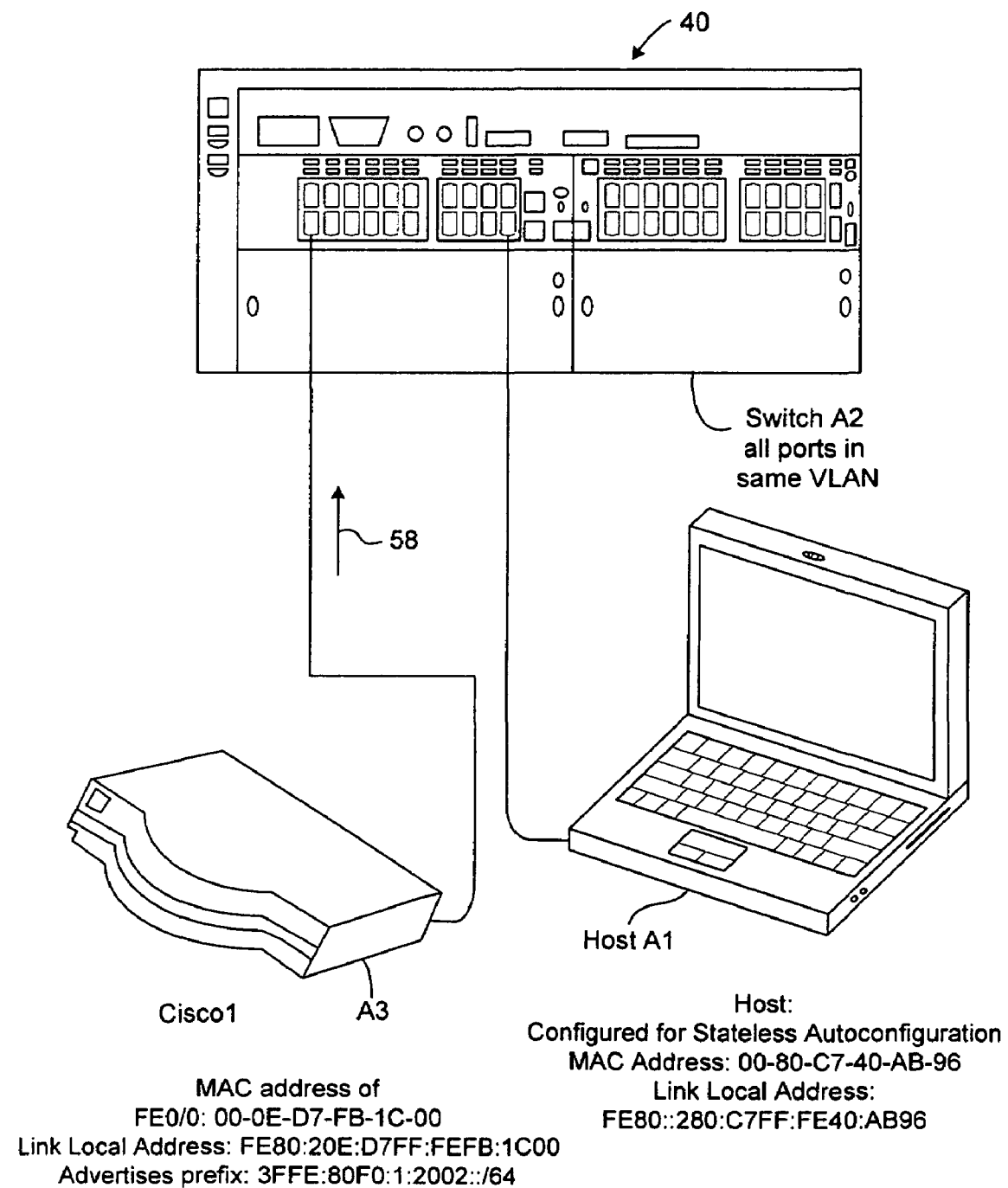
Figure 1B:
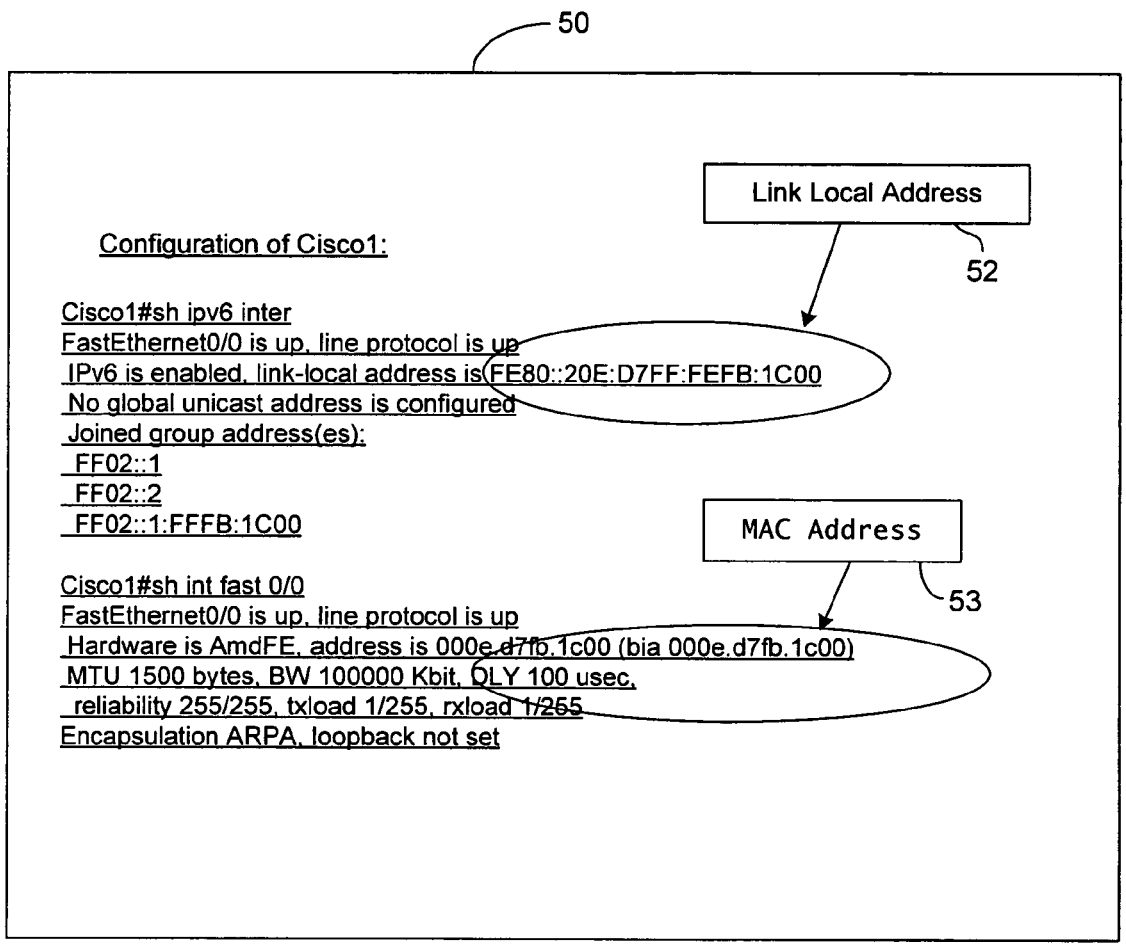

FIG. 1A is a diagram of a network system 40, in accordance with an embodiment of the invention, where the network device 105 is in a switch embodiment. In the example of FIG. 1, Host A1 goes through its normal autoconfiguration process when it is booted. This process is listed below, and the configuration information 50 in the switch A2 is shown in FIG. 1B.

Step 1: Interface (in the Host A1) creates a link-local address 52.

Step 2: Interface joins a multicast group.

Step 3: Interface checks for a duplicate address.

Step 4: Interface assigns itself the link-local address 52.

Step 5: Host A1 receives Router advertisement with prefix (es) from router (Cisco1) A3.

Step 6: Host A1 creates, tests, and assigns address to the interface.

The MAC address 53 is also shown in FIG. 1B. The router A3 may be, for example, of the type commercially available from Cisco Systems, Inc., San Jose, Calif.

FIG. 1C illustrates the configuration information 54 for a Host A1 with no IPV6 network connection. The link local address 55 is shown in the configuration information 54.

In FIG. 1D, the router A3 will send out a router advertisement message 58 that is received by the host A1. The message 58 will include an advertised network prefix 60.

Figure 2A:
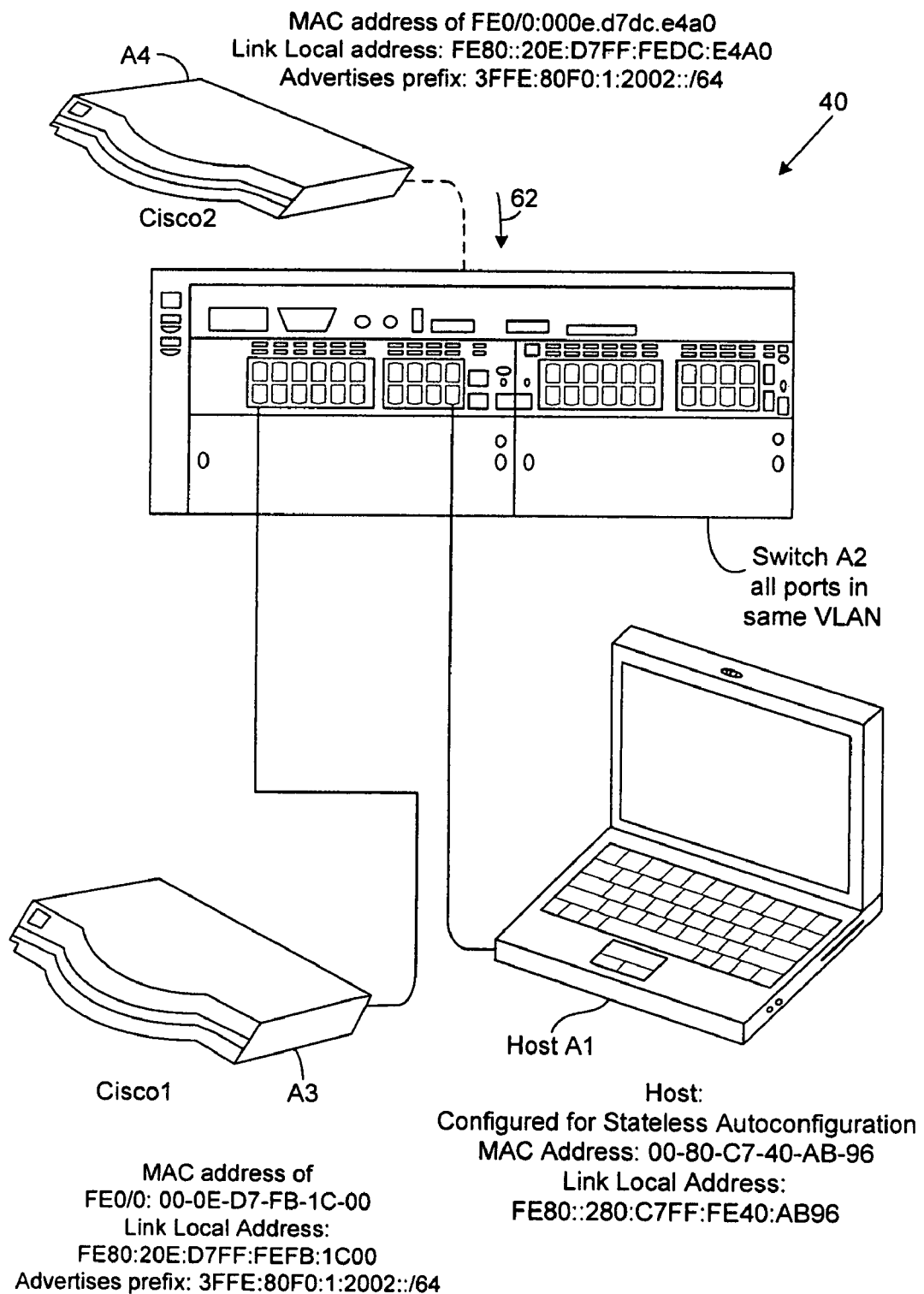

In FIG. 1E, the host A1 has received the router advertisement 58. The host A1 becomes a member of an advertised network and a default gateway is sent to the link local address of the router A3, as shown by the configuration data 62.

n FIG. 2A, router (Cisco2) A4 is inserted into the network 40 and the router A4 advertises the same prefix 60 (in a router advertisement 62) as the prefix 60 from router A3. The host A1 receives router advertisements 58 and 62 of the router 58 and router 62, respectively, and adds the router A4 as a default gateway (in this case, router A4 is preferred). As shown in the configuration Information 64 of FIG. 2B, the configuration data 65 shows that host A1 now has two default gateways, with router A4 as the preferred default gateway. All traffic originating from Host A1 destined to a host that is not on the local network would go to router A4, where packets could be spoofed and sent on to the packets' final destination.

Another example would be that router A4 advertises additional networks, which Host A1 automatically becomes a member of. Host A1 now becomes vulnerable to attacks.

Table 1 shows the Router Advertisement 62 of router A4 with additional network prefix of 3ffe:2002:1:aaaa::/64. FIG. 2C shows a portion 66 of the advertisement 62, where the advertised prefix are shown in portions 67 and 68.

TABLE 1

Frame decode:

Frame 10 (150 bytes on wire, 150 bytes captured)
    Arrival Time: Mar 23, 2004 14:20:28.191136000
    Time delta from previous packet: 2.350486000 seconds
    Time since reference or first frame: 40.013390000 seconds
    Frame Number: 10
    Packet Length: 150 bytes
    Capture Length: 150 bytes
Ethernet II, Src: 00:0e:d7:dc:e4:a0, Dst: 33:33:00:00:00:01
    Destination: 33:33:00:00:00:01 (IPv6-Neighbor-
Discovery_00:00:00:01)
    Source: 00:0e:d7:dc:e4:a0 (Cisco__dc:e4:a0)
    Type: IPv6 (0x86dd)
Internet Protocol Version 6
    Version: 6
    Traffic class: 0xe0
    Flowlabel: 0x00000
    Payload length: 96
    Next header: ICMPv6 (0x3a)
    Hop limit: 255
    Source address: fe80::20e:d7ff:fedc:e4a0
    Destination address: ff02::1
Internet Control Message Protocol v6
    Type: 134 (Router advertisement)
    Code: 0
    Checksum: 0xd108 (correct)
    Cur hop limit: 64
    Flags: 0x00
        0... .... = Not managed
        .0.. .... = Not other
        ..0. .... = Not Home Agent
        ...0 0... = Router preference: Medium
    Router lifetime: 1800
    Reachable time: 0
    Retrans time: 0
    ICMPv6 options
        Type: 1 (Source link-layer address)
        Length: 8 bytes (1)
        Link-layer address: 00:0e:d7:dc:e4:a0
    ICMPv6 options
        Type: 5 (MTU)
        Length: 8 bytes (1)
        MTU: 1500
    ICMPv6 options
        Type: 3 (Prefix information)
        Length: 32 bytes (4)
        Prefix length: 64
        Flags: 0xc0
            1... .... = Onlink
            .1.. .... = Auto
            ..0. .... = Not router address
            ...0 .... = Not site prefix
        Valid lifetime: 0x00278d00

Preferred lifetime: 0x00093a80
        Prefix: 3ffe:2002:1:aaaa::
    ICMPv6 options Type: 3 (Prefix information)
        Length: 32 bytes (4)
        Prefix length: 64
        Flags: 0xc0
            1... .... = Onlink
            .1.. .... = Auto
            ..0. .... = Not router address
            ...0 .... = Not site prefix
        Valid lifetime: 0x00015180

TABLE 1-continued

Frame decode:

Preferred lifetime: 0x000151580
        Prefix: 3ffe:80f0:1:2002::

FIG. 2D shows the configuration 70 of Host Al after it received advertisement 62 from router A4. The Host A1 automatically became a member of network 3FF3:2002:1:AAA as shown in data portion 71.

Figure 4:
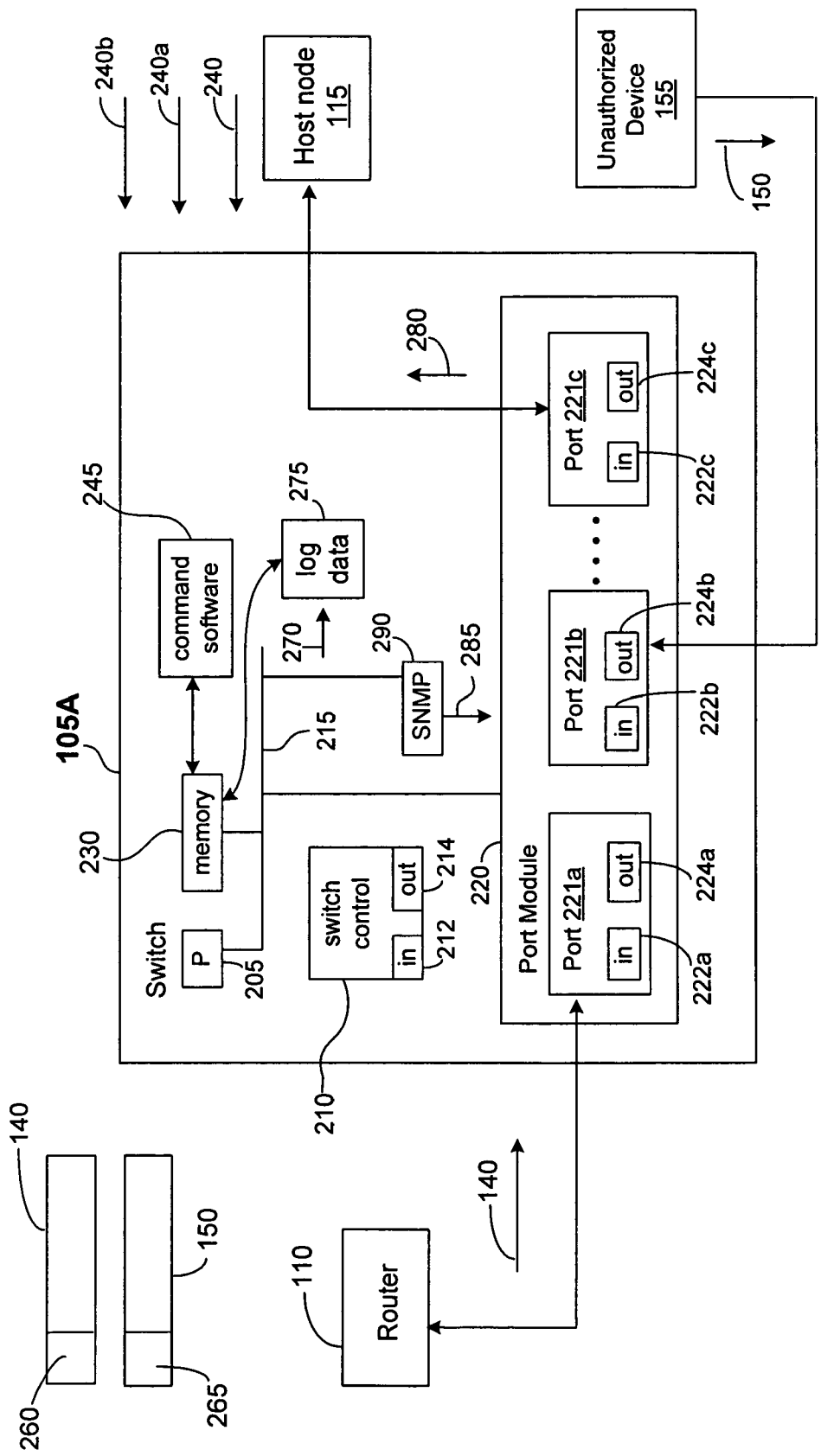
FIG. 4 is a block diagram of a network device, in accordance with an embodiment of the invention.

FIG. 4 is a block diagram of a network device 105A in a switch embodiment, in accordance with an embodiment of the invention. In networks, a switch is a device that filters and forwards packets between Local Area Network (LAN) segments. Switches operate at the data link layer (layer 2) and sometimes at the network layer (layer 3) of the OSI Reference Model and therefore support any packet protocol. The switch's processor 205 performs overall configuration and control of the operation of the switch 105A. The The port module 220 has the multiple network ports (generally ports 221) of the switch 105A. In the example of FIG. 4, the port module 220 has ports 221a, 221b, and 221c. In practice, the port module 220 typically has additional ports. Each of the ports 221 typically includes an inbound buffer and an outbound buffer. For example, the port 221a has inbound buffer 222a and outbound buffer 224a, while the port 221b has inbound buffer 222b and outbound buffer 224b. The inbound buffer 222a is configured to receive packets from the network medium connected to the port module 220 and the outbound buffer 224a is configured to queue data associated with the transmission of packets to be sent to the network medium. The inbound buffer 222b and outbound buffer 224b perform these same functions. The port module 220 includes circuits (not specifically shown in FIG. 4) to connect its ports 221 to the switch bus 215 which is connected to a switch control 210 which includes inbound buffer 212 and outbound buffer 214 for exchanged data over a switch bus 215 and port module 220. The switch control 210 may be implemented in, for example, application specific integrated circuit (ASIC).

A memory 230 will hold received packets for processing by the processor 205.

The network device 105 (e.g., switch 105A in the example of FIG. 4) can filter out router advertisements from an unauthorized device 155 and provide improved security and better control of the network 100 (FIG. 3), based upon the following method. A network administrator (who controls the network infrastructure) can control which particular network devices will be used as routers on the network 100. The network administrator can specify the particular ports 221 in the switch 105A that are permitted to process router advertisements and specify particular ports 221 that are not permitted to process (i.e., are required to filter) router advertisements.

Typically, the network administrator can send port configuration commands 240 from, for example, a host node 115, in order to specify the particular port 221 that will be permitted to process the router advertisements and to specify the particular ports 221 that will be required to filter the router advertisements. As described in the example below, the commands 240 can be the command 240a and the command 240b. Typically, the port configuration commands 240 are received by a port (e.g., port 221c) from the host node 115. A command software 245 (which is typically stored in the memory 230) can process the port configuration commands 240.

Alternatively, the network administrator can directly input the port configuration commands 240 into the switch 105A, by manually entering the port configuration commands 240 into a user interface (if available) of the switch 105A. The command software 245 can then process the port configuration commands 240.

Based upon the port configurations commands 240, the switch control 210 can configure a particular port 221 to accept router advertisements for further processing, and can configure the other ports 221 to filter (drop) router advertisements.

An example of the filtering process for router advertisements is now described below. Assume that the network administrator is aware that the port 221a (i.e., "port 1") is connected to a router 110 (with processor 135) which is the proper designated router for the network 130. Assume further that an unauthorized device has been connected to the port 221b (i.e., "port 2"). Of course, the unauthorized device can also be connected to the port 221 (i.e., "port 3") or other additional ports of the switch 105A, in another example.

The network administrator can then permit the transmission of command 240a (command #1) which is processed by the command software 245. The command 240a indicates the function "allow router-advertisement port 1" which allows router advertisements to port 221a to be processed. In other words, the command 240a permits the switch control 210 to configure the port 221a so that all router advertisements 140 received by port 221a is forwarded to all ports 221 for transmission. For example, the router advertisement 140 is received in the inbound buffer 222a of port 221a. The switch control 210 identifies a received packet as a router advertisement 140 on port 221a based upon a predefined address in field 260 (see FIG. 2) in the router advertisement 140. When the switch control 210 identifies a router advertisement 140 that is received by the inbound buffer 222a in the port 221a, the switch control 210 will accept the router advertisement 140 in the inbound buffer 212 and transmit the router advertisement 140 from the outbound buffer 214. As a result, the switch control 210 permits the advertisement 140 to be transmitted from the outbound buffers 224b and 224c of ports 221b and 221c, respectively, to other hosts 115 in the network 130 (FIG. 3). The switch control 210 will also permit the router advertisement 140 to be transmitted from the outbound buffers of any additional ports 221 in the port module 220. As a result, all hosts 115 in the network 130 will receive the router advertisements 140. Based upon the router advertisements 140, all hosts 115 will learn that the router 110 is their default gateway to network 125 (FIG. 1) and will obtain additional configuration data related to the router 110.

The network administrator also permits the transmission of command 240b (command #2) which is processed by the command software 245. The command 240b indicates the function "disable router-advertisement port 2-3" which would disable router advertisements 150 to ports 221b and 221c. In other words, the command 240b permits the switch control 210 to configure the port 221b and 221c so that all router advertisements 150 received by port 221b and port 221 are filtered (dropped), and the hosts 115 are prohibited from adding the unauthorized device 155 (connected to port 221b and/or port 221c) as a designated router. These router advertisements 150 originate from an unauthorized device 155. As an example, the router advertisement 150 is received in the inbound buffer 222b of port 221b. The switch control 210 identifies a received packet as a router advertisement 150 on port 221b based upon a predefined address in field 265 (see FIG. 4) in the router advertisement 150. When the switch control 210 identifies a router advertisement 150 that is received by the inbound buffer 222b in the port 221b, the switch control 210 will not accept the router advertisement 150 in the inbound buffer 212 and will not transmit the router advertisement 150 from the outbound buffer 214. As a result, the switch control 210 does not permit the advertisement 150 to be transmitted from the outbound buffers 224c and 224a of ports 221c and 221a, respectively, to other hosts 115 in the network 130 (FIG. 1). The switch control 210 will also not permit the router advertisement 150 to be transmitted from the outbound buffers of any additional ports 221 in the port module 220. As a result, the switch 105A is able to filter the router advertisement 150 from an authorized device 155, and all hosts 115 in the network 130 will not receive the router advertisements 150. Therefore, all hosts 115 will not erroneously learn the unauthorized device 155 as the default gateway to the network 125 (FIG. 3). Therefore, an embodiment of the invention allows an implementation of IPV6 in networks to have improved security and better control of devices that can impact network functionality.

Therefore, in the above embodiment of the invention, the network switch 105A generates a response when a router advertisement 150 is received in the port 221b or 221c. This response is the filtering of the router advertisement 150 after the router advertisement 150 is received in the filtered ports (i.e., ports 221b and 221c which are not connected to the proper designated router 110 in the above example).

Another response to the receipt of a router advertisement 150 in the filtered ports (i.e., ports 221b and 221c which are not connected to the proper designated router 110 in the above example) may be the creation of a flag 270 by the command software 245 after the router advertisement 150 is received in the port 221b or 221c. The command software 245 has a logging function that can generate a flag 270 whenever a router advertisement 150 is received in the filtered ports. This flag 270 is recorded by the command software 245 in log data 275. The log data 275 may be stored in memory such as memory 230. The processor 205 can then format the log data 275 into a packet 280 and the switch control 210 can permit transmission of the packet 280 to a host 115. As a result, the flag 270 in the log data 275 can be viewed by the network administrator via a suitable user interface in, for example, a host 115. Therefore, the flag 270 alerts the network administrator that a router advertisement 150 has been received by the ports 221b or 221c which are not connected to a designate router 110.

Another response to the receipt of a router advertisement 150 in the filtered ports (e.g., ports 221b and 221c in the above example) may be the transmission of an SNMP report 285 to indicate receipt of the router advertisement 150 in a filtered port. The SNMP report 285 can be viewed by the network administrator via a suitable user interface in, for example, a host 115. Therefore, the SNMP report 285 alerts the network administrator that a router advertisement 150 has been received by the ports 221b or 221c which are not connected to a designate router 110. An SNMP engine 290 generates the SNMP report 285. As known to those skilled in the art, SNMP (Simple Network Management Protocol is an Internet standard developed for managing nodes on an IP network. SNMP is a widely used network-monitoring protocol that is supported on most major platforms. SNMP manages and monitors various types of network equipment (including computers, routers, and hubs) by passing data from SNMP agents to workstations, and reporting activity in each network device.

An example of a command syntax to accomplish the above operation could be as follows, as shown in Table 2.

TABLE 2

On the switch CLI (in configuration mode):
Interface 1>
    Permit ipv6 router-advertisements
Interface 2-24
    Deny ipv6 router-advertisements The above commands would influence the packet processing of the inbound interface. As the packets enter the port, the packets would be permitted or denied by the above filtering rules.

The software or engines shown in FIG. 4 can be implemented in hardware, software, firmware, or a combination of hardware, software, and firmware. The various components shown in FIG. 4, such as, for example, the processor 205, memory 230, switch control 210, port module 220, and switch bus 215 can be implemented in hardware or other suitable known component structures.

Figure 5:
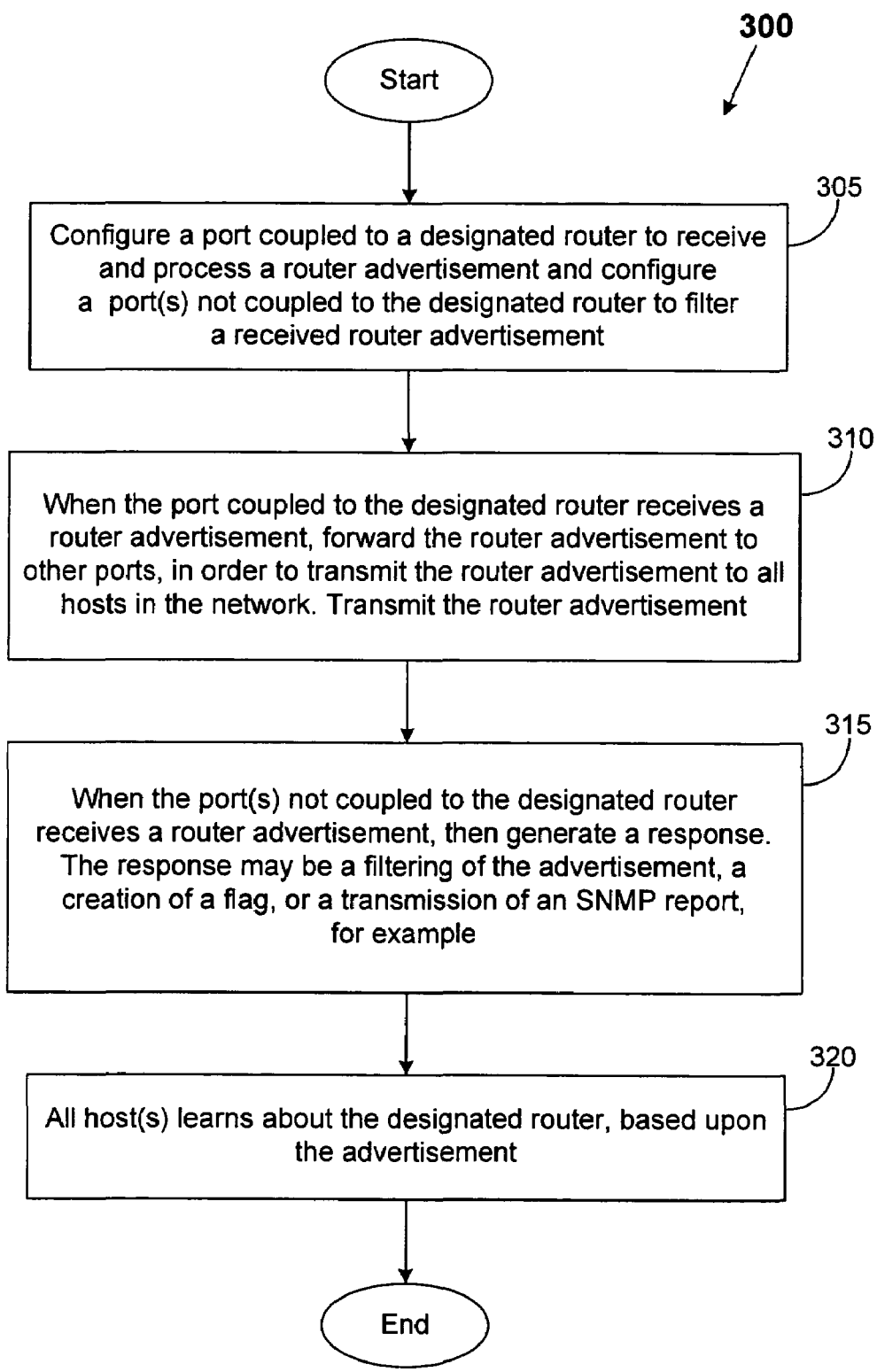
FIG. 5 is a flowchart of a method in accordance with an embodiment of the invention.

FIG. 5 is a flowchart of a method 300 in accordance with an embodiment of the invention. In step (305), a port coupled to a designated router is configured to receive and process a router advertisement, and all port(s) not coupled to the designated router are configured to filter a received router advertisement. The ports are in a network device such as, for example, a network switch.

In step (310), when the port coupled to the designated router receives a router advertisement, then the router advertisement is forwarded to other ports, in order to transmit the router advertisement to all hosts in the network. The router advertisement is transmitted to all hosts in the network.

In step (315), when the port(s) not coupled to the designated router receives a router advertisement, then a response is generated. The response may be, for example, a filtering of the router advertisement, a creation of a flag, or a transmission of an SNMP report.

It is understood that step (310) and step (315) may occur concurrently, or step (315) may occur before step (310), or step (310) may occur before step (315).

In step (320), all host(s) learns about the designated router, based upon the router advertisement.

Since the method 300 limits the number of advertisements that are sent to the hosts, the number of virtual interfaces (created for each network that will use a particular router) that a host will create will be limited. This limiting feature advantageously prevents denial of service attacks or other types of attacks that can negatively affect the host.

Figure 6:
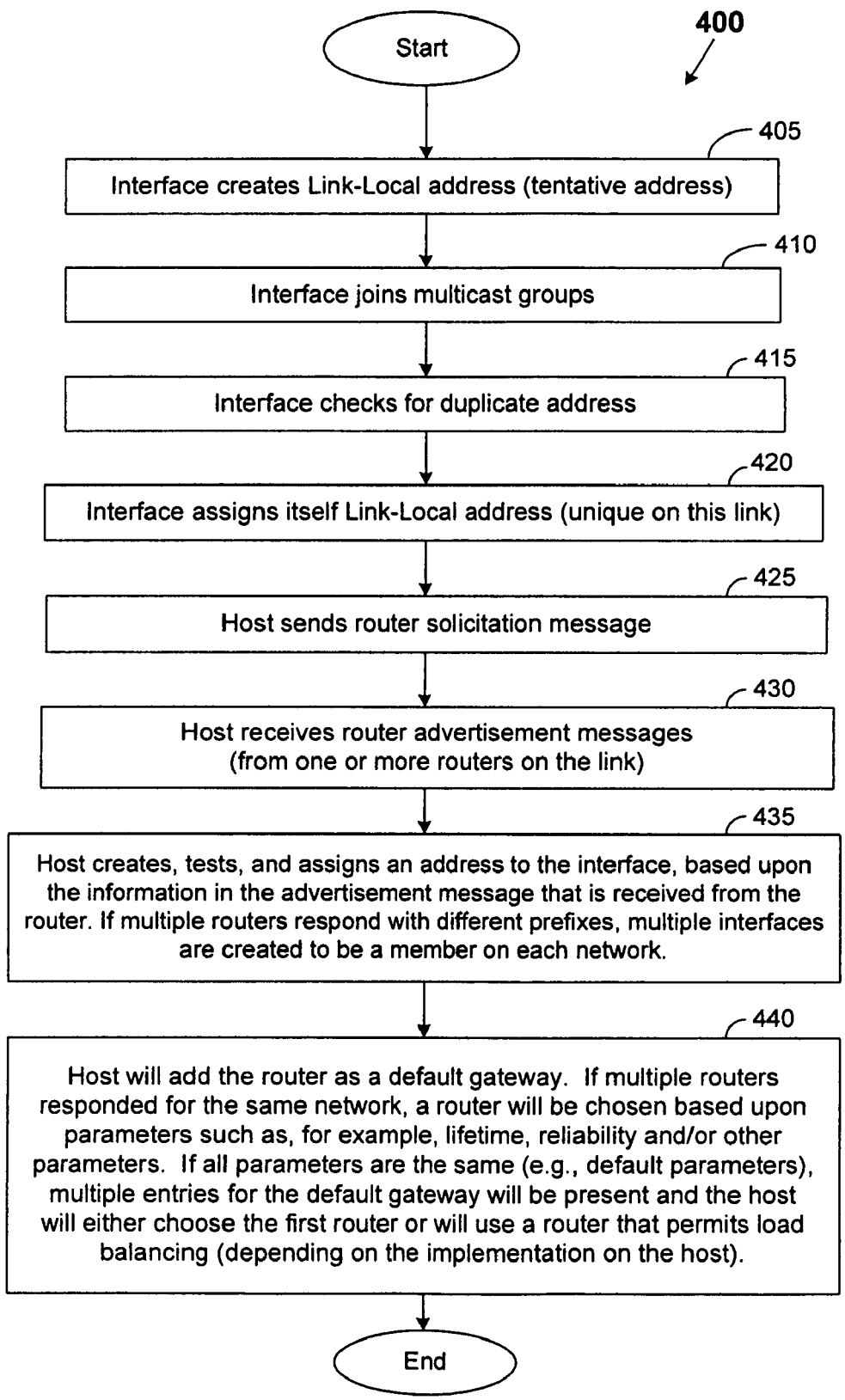
FIG. 6 is a flowchart of a method used in the Internet Protocol version 6 (IPV6).

FIG. 6 is a flowchart of a method 400 used in the Internet Protocol version 6 (IPV6), shown for background purposes. In step (405), an interface (driver) of a host creates a Link-Local address (tentative address) which is an internal address that is used on a link that is coupled to the host. In step (410), the interface joins the multicast groups, by using the Link-local address to communicate with multicast addresses. In step (415), while sending out multicast packets, the host interface checks for duplicate address, in order to determine if another device already has the Link-Local address. If another device does not have the Link-Local address, then in step (420), the interface assigns itself the Link-Local address (which is a unique address on the link).

In step (425), the host sends a router solicitation message, in order to determine the default gateway for the link. In step (430), the host receives router advertisement messages (from one or more routers on the link).

In step (435), the host creates, tests, and assigns a unique address to interface, based upon the information in the advertisement message that is received from the router. If multiple routers respond to the host with different prefixes, multiple interfaces are created to be a member on each network.

In step (440), the host will add the router as a default gateway. If multiple routers responded for the same network, one of the multiple router will be chosen based upon parameters such as, for example, lifetime, reliability and/or other parameters. If all parameters are the same (e.g., default parameters), multiple entries for the default gateway will be present and the host will either choose the first router or will use a router that permits load balancing (depending on the implementation on the host).

The method of certain embodiments of the invention may be implemented in hardware, software, firmware, or a combination thereof. In one embodiment, the method is executed by software or firmware that is stored in a memory and that is executed by a suitable instruction execution system. If implemented in hardware, as in an alternative embodiment, the method can be implemented with any suitable technology that is well known in the art.

The various engines or software discussed herein may be, for example, computer software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

While the present invention has been described herein with reference to particular embodiments thereof, a latitude of modification, various changes and substitutions are intended in the foregoing disclosures, and it will be appreciated that in some instances some features of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular embodiment disclosed as the best mode contemplated for carrying out this invention, but that the invention will include all embodiments and equivalents falling within the scope of the appended claims.

What is claimed is:

1. An apparatus for suppressing a router advertisement, the apparatus comprising:
   a network device configured to filter a router advertisement from an unauthorized device;
   wherein the network device includes a switch control that configures a first port in the network device to permit transmission of any router advertisement that is received by the first port; and
   wherein the switch control configures a second port in the network device to disable any router advertisement that is received by the second port.

2. The apparatus of claim 1, wherein the network device prevents a client from routing packets to the unauthorized device.

3. The apparatus of claim 1, wherein the network device comprises a network switch.

4. The apparatus of claim 3, wherein the network switch comprises:
   a port module including the first port and the second port; and
   wherein the switch control is configured to permit the first port to process the advertisement if the first port is connected to the router and to permit the second port to disable the advertisement if the second port is not connected to the router.

5. The apparatus of claim 4, wherein the first port is coupled to a designated router; and wherein the second port is coupled to the unauthorized device.

6. The apparatus of claim 1, wherein the unauthorized device comprises a router.

7. The apparatus of claim 1, wherein the network device is in a communication network based upon the Internet Protocol version 6 (IPV6) protocol.

8. A method for suppressing a router advertisement, the method comprising:
   receiving a router advertisement by a network device;
   permitting transmission, by a first port in the network device, of any router advertisement that is received by the first port; and
   filtering, by a second port in the network device, any router advertisement that is received by the second port from an unauthorized device.

9. The method of claim 8, wherein the act of filtering comprises:
   designating the first port to receive any router advertisement and designating the second port to filter any router advertisement.

10. The method of claim 8, further comprising:
    preventing a client from routing packets to the unauthorized device.

11. The method of claim 8, wherein the act of filtering is performed by a network device.

12. The method of claim 11, wherein the network device comprises a network switch.

13. The method of claim 9, wherein the first port is coupled to a designated router; and wherein the second port is coupled to the unauthorized device.

14. The method of claim 13, wherein the unauthorized device comprises a router.

15. The method of claim 11, wherein the network device is in a communication network based upon the Internet Protocol version 6 (IPV6) protocol.

16. An apparatus for detecting a router advertisement, the apparatus comprising:
    a network device configured to generate a response when a router advertisement is received by the network device;
    wherein the network device includes a switch control that configures a first port in the network device to permit transmission of any router advertisement that is received by the first port; and
    wherein the switch control configures a second port in the network device to disable any router advertisement that is received by the second port.

17. The apparatus of claim 16, wherein the response comprises:
    filtering of the router advertisement.

18. The apparatus of claim 16, wherein the response comprises: creating of a flag to indicate receipt of the router advertisement in the second port.

19. The apparatus of claim 16, wherein the response comprises: transmitting an SNMP report to indicate receipt of the router advertisement in the second port.

20. A method for detecting a router advertisement, the method comprising:
    receiving a router advertisement by a network device;
    generating a response when the router advertisement is received by the network device;
    permitting transmission, by a first port in the network device, of any router advertisement that is received by the first port; and
    disabling, by a second port in the network device, any router advertisement that is received by the second port.

21. The method of claim 20, wherein the response comprises:
    filtering of the router advertisement.

22. The method of claim 20, wherein the response comprises: creating of a flag to indicate receipt of the router advertisement in the second port.

23. The method of claim 20, wherein the response comprises: transmitting an SNMP report to indicate receipt of the router advertisement in the second port.

24. An apparatus for detecting a router advertisement, the apparatus comprising:
    means for receiving a router advertisement by a network device;
    means for generating a response when the router advertisement is received by the network device;

means for permitting transmission, by a first port in the network device, of any router advertisement that is received by the first port; and means for disabling, by a second port in the network device, any router advertisement that is received by the second port.

25. An article of manufacture, comprising:

a machine-readable medium having stored thereon instructions to:

receive a router advertisement by a network device;

generate a response when the router advertisement is received by the network device;

permit transmission, by a first port in the network device, of any router advertisement that is received by the first port; and disable, by a second port in the network device, any router advertisement that is received by the second port.

* * * * *